United States Patent [19]

Niemi

[11] 3,816,050
[45] June 11, 1974

[54] NECK RING MECHANISM FOR A PLASTIC INJECTION

[75] Inventor: William B. Niemi, East Longmeadow, Mass.

[73] Assignee: Package Machinery Company, East Longmeadow, Mass.

[22] Filed: July 10, 1972

[21] Appl. No.: 270,529

[52] U.S. Cl............. 425/387 B, 425/DIG. 203, 425/DIG. 211, 425/DIG. 213
[51] Int. Cl............................................. B29c 11/00
[58] Field of Search 425/387 B, DIG. 203, DIG. 204, 425/DIG. 206, DIG. 207, DIG. 208, DIG. 209, DIG. 211, DIG. 213, DIG. 214

[56] References Cited
UNITED STATES PATENTS

| 3,170,970 | 2/1965 | Adams | 425/DIG. 209 |
|---|---|---|---|
| 3,264,684 | 8/1966 | Moslo | 425/DIG. 209 |
| 3,429,002 | 2/1969 | Soffron | 425/DIG. 213 |
| 3,480,993 | 12/1969 | Schjeldohl et al. | 425/DIG. 209 |
| 3,616,491 | 11/1971 | Vollers | 425/DIG. 209 |
| R26,265 | 9/1967 | Farkos | 425/DIG. 209 |

Primary Examiner—J. Spencer Overholser
Assistant Examiner—Ronald J. Shore
Attorney, Agent, or Firm—McCormick, Paulding & Huber

[57] ABSTRACT

A neck ring mechanism for a plastic injection blow molding machine of the type which has a rotatable head supporting two banks of core pins which extend in opposite directions and wherein the head is rotatable so that while one bank of pins is closed upon by the halves of a parison mold, the other bank of pins is closed upon by the halves of a blow mold. The neck ring mechanism is carried by the head and includes a pair of carriers for each bank of pins. Each carrier supports a bank of neck ring halves which close upon the bases of the pins to define therewith the neck portion of the parison and final product formed on each pin. The carriers associated with each bank are moved simultaneously toward and away from each other by the movement of one such carrier, this movement being transferred to the other carrier by means of a pinion rotatably supported on the head and which is engaged on opposite diametric sides by a pair of racks, one such rack provided on each such carrier.

7 Claims, 2 Drawing Figures

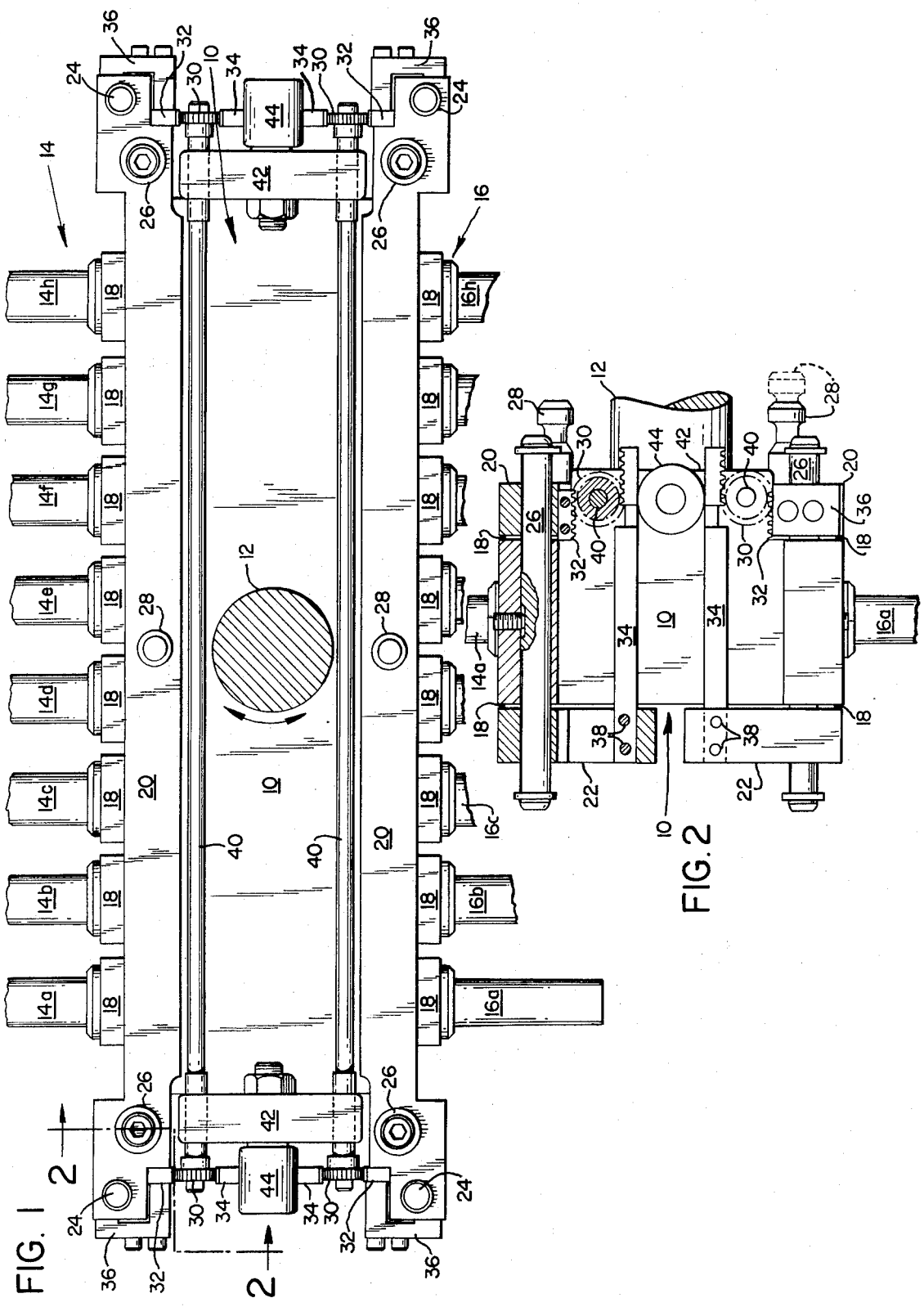

NECK RING MECHANISM FOR A PLASTIC INJECTION

BACKGROUND OF THE INVENTION

In plastic injection blow molding machines, a core pin is used in association with a split parison mold and also in association with a split blow mold. The core pin is inserted in the cavity defined in the parison mold, and plastic is injected into the cavity around the pin to form the parison. Then, the pin is transferred with the parison on it into the cavity defined in the blow mold. When the pin is located in the blow mold cavity, the parison is blown into the final product shape and size defined by the blow mold cavity.

It is necessary in such machines to provide a neck ring structure comprising two halves which surround the base of the core pin or one end thereof to define therewith the shape and final size of the neck portion of the parison and of the final product. These neck ring halves are closed with the closing of the parison mold halves to complete the parison cavity and the neck ring halves remain closed after the parison has been formed and the parison mold halves are separated or opened. They remain closed to retain the parison on the pin as it is transferred into position between the open halves of the blow mold. Then, the blow mold halves are closed around the neck ring structure and the core pin and the parison is blown. Then, when the blow mold halves are opened, the neck ring halves are also opened to release the finished product from the core pin.

SUMMARY OF THE INVENTION

As will be described in greater detail hereinafter, the neck ring mechanism of the present invention is particularly adapted for use on a plastic injection blow molding machine of the type having a rotatable head which supports two longitudinally extending banks of core pins, the said banks of pins projecting oppositely of each other from the head. The head is rotatable so that when one bank of pins is in position to be closed upon by relatively movable mold halves to define cavities around the pins for the forming of parisons upon the injection of plastic into the cavities, the oppositely projecting bank of pins is in position to be closed upon by relatively movable mold halves to define cavities around the pins and previously formed parisons to accommodate the blowing of the parisons to the final product size and shape. The neck ring mechanism for each bank is identical or similar to that for the other bank and it comprises a pair of longitudinally extending carriers supported for rotation with the head and for movement toward and away from each other at opposite sides of the head. A bank of neck ring halves is mounted on each carrier for cooperation with the bank on the other carrier to close around the bases of the associated core pins and to define therewith the neck portions of the parisons and final products. The means for operating the carriers for simultaneous movement toward and away from each other whereby to close and open the neck ring halves includes at least one pinion rotatably supported on the head and at least one rack secured to each carrier. The rack on one carrier engages the pinion diametrically opposite of the engagement of the pinion with the rack on the other carrier. Therefore, movement of either carrier at either side of the head will cause equal movement in the opposite direction of the carrier at the other side of the head.

BRIEF DESCRIPTION OF THE DRAWINGS

FIG. 1 is a vertical elevational view of the neck ring mechanism provided in accordance with the present invention, and FIG. 2 is an end view with a portion thereof shown in vertical section as indicated by the line 2—2 in FIG. 1.

DESCRIPTION OF THE PREFERRED EMBODIMENT

The rotatable head associated with the plastic injection blow molding machine is indicated generally by the reference number 10 and it is mounted upon a shaft 12 so that it can be rotated in the plane of the drawing of FIG. 1. Preferably, but not necessarily, the head is rotated or oscillated through 180° of movement rather than through 360° of movement. Also, it is not essential that the head be rotated in the plane of the drawing of FIG. 1, since it can be rotated or oscillated about an axis in said plane provided a shaft different from shaft 12 is utilized.

The head supports two longitudinally extending banks of core pins 14 and 16 which project from the head in opposite directions, there being eight such core pins shown for each bank and identified as 14a–14h and 16a–16h, respectively. The head 10 is rotated or oscillated so that when one bank of pins, for example the bank 14, is associated with a parison mold (not shown), the other bank of pins, for example the bank 16, is associated with a blow mold (not shown). That is, while the bank of pins 14 is positioned as shown in FIG. 1, the halves of a parison mold may be moved toward each other to close on the pins and then move away from each other in movement normal to the plane of the drawing. Similarly, the bank of pins 16 in the position shown may be associated with the halves of a blow mold which may move toward each other to close around the pins and then away from each other in movement normal to the plane of FIG. 1. The pins in each bank are identical to each other, and each pin is associated with a pair of neck ring halves 18, 18.

The neck ring mechanism associated with each bank of core pins is identical to the mechanism associated with the other bank of core pins, and thus it will be necessary to describe only one such mechanism.

Such neck ring mechanism includes a pair of longitudinally extending carriers 20 and 22, the carrier 20 being located along one side of the head 10 and the carrier 22 being located along the opposite side thereof. The carriers are mounted for rotation or oscillation with the head and also for movement toward and away from each other relative to the head. That is, a pair of dowel pins 24, 24 extending between the carriers 20 and 22 guide them in movement toward and away from each other in a path normal to the plane of the drawing, FIG. 1, and a second pair of pins 26, 26 provided with heads extending transversely of the head 10 to further guide the relative movement of the carriers and to limit the extent of such movement away from each other.

In such movement of the carriers 20 and 22 toward each other, oppositely disposed and cooperating neck ring halves 18, 18 are brought into engagement with each other around the base of an associated core pin in either the bank 14 or the bank 16. That is, the carrier 20 carries a bank of eight neck ring halves 18, 18 which face inwardly of the head 10 to cooperate with a similar bank of neck ring halves 18, 18 mounted on the carrier 22. Accordingly, the carriers 20 and 22 are moved toward each other to close the neck ring halves when their associated bank of core pins is positioned between the parison mold halves for closing of the said mold halves around the pins. The neck ring halves remain closed and thus there is no relative movement of the neck ring carriers 20 and 22 until their associated bank of core pins has been moved into the blow mold cavities and the blow molding operation has been completed and the blow mold halves are opened. Then, the carriers 20 and 22 are moved away from each other to release the neck portion of the finished product on each associated core pin.

In keeping with the present invention, either carrier 20 or 22 may be moved by some suitable means toward or away from the oppositely disposed carrier and this will result in the simultaneous movement of such oppositely disposed carrier in the opposite direction. To facilitate such operation, an actuating pin 28 is centrally located on each carrier 20 and is provided with a projecting head which can be engaged by the said suitable means to move the carrier 20 toward or away from the carrier 22.

The means effecting transfer of the motion of the carrier 20 to the carrier 22 comprises a pinion 30, a rack 32 on the carrier 20, and a rack 34 on the carrier 22. The pinion 30 is rotatably supported at an end of the head 10 and at the side thereof adjacent the carrier 20. The rack 32 is mounted on the carrier 20 by suitable means 36 and the rack 34 is mounted on the carrier 22 by suitable means 38. The rack 32 engages the pinion 30 on one side thereof, and the rack 34 which is longer and which extends transversely of the head 10 engages the pinion 30 on the diametrically opposite side thereof. Thus, when the pinion 30 is rotated by the rack 32 caused by movement of the carrier 20, the rack 34 is moved an equal amount in the opposite direction and thus to move the carrier 22 equally to but oppositely of the movement of the carrier 20.

Preferably, there are two pinions 30 associated with each set of carriers 20 and 22 and there are two racks 32 associated with each carrier 20 and two racks 34 associated with each carrier 22. That is, a pinion and set of racks is located at each end of the head 10 and at each end of the carriers. More specifically, each pinion 30 is mounted on an end of a shaft 40 which extends through flanges 42, 42 at the ends of the head 10 and which extend to the side thereof. By having the pinions mounted on a common shaft 40, equal movement of the pinions is assured.

Further in accord with the present invention, a roller 44 is rotatably supported by each end flange 42 on the head 10 to project longitudinally outwardly therefrom. As best seen in FIG. 2, each roller 44 provides end support for the elongated racks 34, 34 associated with opposite banks of carriers and core pins. These rollers 44, 44, while providing common support for the racks 34, 34, do not prevent their independent operation and thus do not prevent the independent operation of the neck ring mechanisms associated with the two different banks of core pins 14 and 16.

I claim:

1. A neck ring mechanism for a plastic injection blow molding machine of the type having a rotatable head supporting at least two core pins which project oppositely of each other from the head, the head being rotatable so that when one such pin is in position to be closed upon by relatively movable mold halves to define a cavity around it for the forming of a parison upon the injection of plastic into the cavity, the oppositely projecting pin is in position to be closed upon by relatively movable mold halves to define a cavity around it and a previously formed parison to accommodate the blowing of the parison to final product size and shape, the neck ring mechanism being identical for each pin and comprising a pair of carriers supported for movement toward and away from each other at opposite sides of the head, a neck ring half mounted on each carrier for cooperation with the half on the other carrier to close around the base of the associated core pin and to define therewith the neck portion of the parison and final product, means for operating the carriers associated with each core pin for simultaneous movement toward and away from each other respectively to close and open the neck ring halves including a pinion rotatably supported on an end of the head, and a rack secured to each carrier, the rack on one carrier engaging the pinion oppositely of the engagement of the pinion with the rack on the other carrier, whereby movement of either carrier at either side of the head will cause equal movement in the opposite direction of the carrier at the other side of the head, the pinion associated with the oppositely projecting core pin being rotatably supported on the same end of the head, and a common support for the racks nearest each other but engaging different pinions adapted to permit operation of the carriers associated with one pin independently of the carriers associated with the other pin.

2. The neck ring mechanism defined in claim 1 wherein the head is rotatable on an axis which is parallel to the direction of relative movement of the mold halves.

3. A neck ring mechanism for a plastic injection blow molding machine of the type having a rotatable head supporting two longitudinally extending banks of core pins which project oppositely of each other from the head, the head ring rotatable so that when one bank of pins is in position to be closed upon by relatively movable mold halves to define cavities around the pins for the forming of parisons upon the injection of plastic into the cavities, the oppositely projecting bank of pins is in position to be closed upon by relatively movable mold halves to define cavities around the pins and previously formed parisons to accommodate the blowing of the parisons to final product size and shape, the neck ring mechanism being identical for each bank and comprising a pair of longitudinally extending carriers supported for movement toward and away from each other at opposite sides of the head, a bank of neck ring halves mounted on each carrier for cooperation with the bank on the other carrier to close around the bases of the associated core pins and to define therewith the neck portions of the parisons and final products, means for operating the carriers associated with each bank for simultaneous movement toward and away from each other respectively to close and open the neck ring halves including a pinion rotatably supported on each end of the head, and a rack secured to each carrier for engagement with each pinion, the racks on one carrier engaging the pinions oppositely of the engagement of the pinions with the racks on the other carrier, whereby movement of either carrier at either side of the head will cause equal movement in the opposite direction of the carrier at the other side of the head.

4. The mechanism set forth in claim 3 wherein a shaft extends between the pinions associated with each bank of core pins to assure their identical rotation.

5. The mechanism as defined in claim 4 wherein a roller is rotatably mounted at each end of the head between the two pinions at each end which are associated with the oppositely directed banks of pins, respectively, and wherein each such roller at diametrically opposed points supports racks extending from the carriers on one side of the head.

6. The mechanism of claim 4 wherein a carrier actuating pin extends from at least one carrier associated with each bank of core pins.

7. The neck ring mechanism defined in claim 3 wherein the head is rotatable on an axis which is parallel to the direction of relative movement of the mold halves.

* * * * *